United States Patent
Agarwal

[19]

[11] Patent Number: 5,936,673
[45] Date of Patent: *Aug. 10, 1999

[54] TEMPORAL TILE STAGGERING FOR BLOCK BASED VIDEO COMPRESSION

[75] Inventor: Rohit Agarwal, Hillsboro, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/451,730

[22] Filed: May 26, 1995

[51] Int. Cl.⁶ .................................................. H04N 07/18
[52] U.S. Cl. ......................... 348/420; 348/421; 348/416; 348/413
[58] Field of Search .................................. 348/420, 416, 348/404, 398, 418, 405, 422, 421, 415, 413, 699, 700, 412, 410

[56] References Cited

U.S. PATENT DOCUMENTS

| | | | |
|---|---|---|---|
| 4,972,261 | 11/1990 | Whalley | 348/415 |
| 5,235,419 | 8/1993 | Krause | 348/416 |
| 5,311,310 | 5/1994 | Jozawa et al. | 348/416 |
| 5,379,122 | 1/1995 | Eschbach | 358/426 |
| 5,384,849 | 1/1995 | Jeong | 348/420 |
| 5,420,942 | 5/1995 | Levit | 382/276 |
| 5,428,395 | 6/1995 | Jeong | 348/412 |
| 5,428,693 | 6/1995 | Murakami et al. | 348/415 |
| 5,471,248 | 11/1995 | Bhargava et al. | 348/420 |
| 5,495,538 | 2/1996 | Fan | 382/233 |
| 5,500,689 | 3/1996 | Lam | 348/699 |
| 5,506,624 | 4/1996 | Moreton et al. | 348/420 |
| 5,534,927 | 7/1996 | Shishikui et al. | 348/400 |
| 5,539,663 | 7/1996 | Agarwal | 364/514 |
| 5,594,504 | 1/1997 | Ebrahimi | 348/416 |
| 5,608,652 | 3/1997 | Astle | 364/514 |
| 5,615,287 | 3/1997 | Fu et al. | 382/232 |
| 5,629,778 | 5/1997 | Reuman | 358/429 |
| 5,654,759 | 8/1997 | Augenbraun et al. | 348/405 |
| 5,666,162 | 9/1997 | Iizuka | 348/415 |
| 5,692,012 | 11/1997 | Virtamo et al. | 348/420 |

Primary Examiner—Tommy P. Chin
Assistant Examiner—Anand S. Rao
Attorney, Agent, or Firm—William H. Murray; N. Stephan Kinsella

[57] ABSTRACT

In block based video compression, a frame is divided into blocks which define a tiling pattern. The tiling pattern is varied from frame-to-frame to prevent an accumulation of errors which tend to appear at tile edges and can increase over time when using block-based compression. In a preferred embodiment, a normal frame is padded by a border all around the normal frame size. The padding is operable to extend any blocks around the periphery of the image frame which might be smaller in dimension than the standard blocks, such as those within the interior of the frame, such that they can be treated by the block-based compression systems as full size blocks.

32 Claims, 11 Drawing Sheets

(ONE FRAME WITH 16 SECTORS)

(ONE SECTOR WITH 80 PIXEL MACRO BLOCKS)

FRAME 0

FRAME 1

FRAME 2

FRAME 3

FRAME 0

FRAME 1

FRAME 2

FRAME 3

TEMPORAL TILE STAGGERING FOR BLOCK BASED VIDEO COMPRESSION

BACKGROUND OF THE INVENTION

1. Field of the Invention

The present invention relates to digital video signal processing and, in particular, to computer-implemented processes and apparatus for reduction of visual artifacts in block-based video compression/decompression systems.

2. Description of the Related Art

Motion estimation is commonly utilized by video encoders in signal processing techniques that compress successive frames of digital video data ("video frames"). When these video frames are to be transmitted via a communication medium of limited bandwidth, or are to be stored in a storage medium having limited storage capacity, it is often desirable to first compress the digital data which represents each frame, so as to reduce the amount of data that needs to be transmitted.

Motion estimation is one of the most computationally intense of the various techniques utilized to compress data. Motion estimation techniques exploit the temporal correlation that often exists between consecutive video frames, in which there is a tendency for objects or image features to move from one location to another on a display device as image refreshing is accomplished from frame to frame.

For instance, frame 1 may contain an object, and frame 2 may contain a set of pixels corresponding to the same object spatially displaced by a few pixels from the location in frame 1. If frame 1 is transmitted to and received by a pixel processor or video processor (which performs any necessary decompression or other decoding), frame 2 may be transmitted including the complete pixel data corresponding to the object. Instead, motion vectors (i.e. "pointers") and difference data are sent representing frame 2 (which are typically easily compressible using standard techniques). These motion vectors and difference data may be utilized by the receiving video processor when decoding the received video frame 2 to reproduce the object from frame 1 at a new location within frame 2. Since such motion vectors and difference data can be represented with fewer bits than the pixels that comprise the object, fewer bits need to be transmitted (or stored) in order to recreate the object in frame 2.

The motion estimation procedure may be performed at the encoder level by comparing given regions or blocks within a current video frame to many regions or blocks within the previous video frame. The process of comparing a given block of one frame to a block of another frame is called "block matching." Blocks are matched by determining a "comparison measurement" between any given pair of blocks. A comparison measurement corresponds to some form of indication of a degree of "difference" between the two regions. What is often done is to look at some or all of the hue and luminance values of the pixels within a block and to use a standard criterion (such as mean absolute error or mean square error) to accomplish accurate block matching. By using the block corresponding to the lowest comparison measurement a best block match is found. The block in the previous video frame may be utilized as described above by the video decoder to reproduce a "duplicate" block in the current video frame.

In most systems, the above-mentioned motion vectors are transmitted for closely-matched block along with some "difference" data for the respective blocks that characterizes difference levels between the "matched" blocks either at the pixel level or as some sort of an average over the regions of the respective blocks. This difference data is usually easily compressible since the relative magnitudes of the differences are usually quite small.

In performing block comparisons, a number of pixels from the previous video frame are accessed for each block of the current video frame that is subjected to motion estimation. In most general purpose video processing systems, the bit maps corresponding to the previous and current video frame pixels are stored in general purpose memory connected to the video processor through a bus. For each block matching procedure the video processor must access the memory many times, which may constitute a high amount of traffic on the bus and a high number of memory accesses. Because of the limited bandwidth of the bus by which the memory is accessed, these memory accesses can tie up use of the bus and memory and thus slow down overall operation of the video processing system.

To avoid this problem, the video processor performing the motion estimation step may contain, for example, a dedicated, special-purpose memory space to store the two video frames being compared so that there is less traffic on the bus. However, such a special-purpose memory space is often unavailable, unfeasible, or otherwise not desired because of the extra complexity of such a special-purpose memory. The special-purpose memory space may be too costly. Further, even a special purpose memory space may be accessed so often during block matching that the video processor may be slowed down.

Typically, a digital video frame is divided into 8×8 blocks and 16×16 macroblocks comprising four 8×8 blocks each. These macroblocks are also referred to as "tiles." The abovementioned block-matching is usually done with whole tiles. Sometimes the 8×8 blocks within the tiles are simultaneously processed conveniently with parallel processing equipment that work best on 8×8 blocks.

When "matched" tiles are put in their new locations in the current frame in accordance with their respective location vectors, and when the data in these tiles is adjusted in accordance with the corresponding "difference" magnitudes, the resulting new frame inevitably has some error buildup along the edges of the tiles. This error is compounded with each additional frame transmitted by the above-described technique until a new complete "reference" frame is transmitted (typically every tenth frame). The gradual buildup of error results in what those skilled in the art refer to as "blocky" visual artifacts. These artifacts can be quite degrading to the overall quality of the transmitted image.

It is accordingly an object of this invention to improve upon the techniques of the known art and to provide a method and apparatus that substantially reduces tile boundary artifacts that would otherwise exist.

Further objects and advantages of this invention will become apparent from the Detailed Description of preferred embodiments which follows.

SUMMARY OF THE INVENTION

The invention is an apparatus and method for reducing observable blockiness in decoded images that are encoded using block-based video compression. In the invention, images are divided into blocks using tiling patterns that are changed from frame-to-frame. Typically, a first image is received and divided into a plurality of blocks using a first tiling pattern. The first image is encoded to generate encoded signals for the first image. A second image is received and is divided into a plurality of blocks using a second tiling pattern different from the first tiling pattern. The blocks of the second image are encoded to generate encoded signals for the second image. A decoder uses the tiling pattern corresponding to the tiling pattern of the encoded image to decode the encoded image, wherein the edges of the blocks of the decoded images preferably are distinctly located from image to image.

In a preferred embodiment, images are padded with a border around the periphery of the image. The padding can be used to pad a relatively smaller block, for example, one less than full or standard block size, which, when performing the tiling pattern shifting or staggering of the invention, may be located on the periphery of the image. The padding extends the smaller block's dimensions such that it may be processed as a full size or standard block.

BRIEF DESCRIPTION OF THE DRAWING

These and other features, aspects, and advantages of the present invention will become more fully apparent from the following description, appended claims, and accompanying drawing, in which:

DETAILED DESCRIPTION

Figure 1:
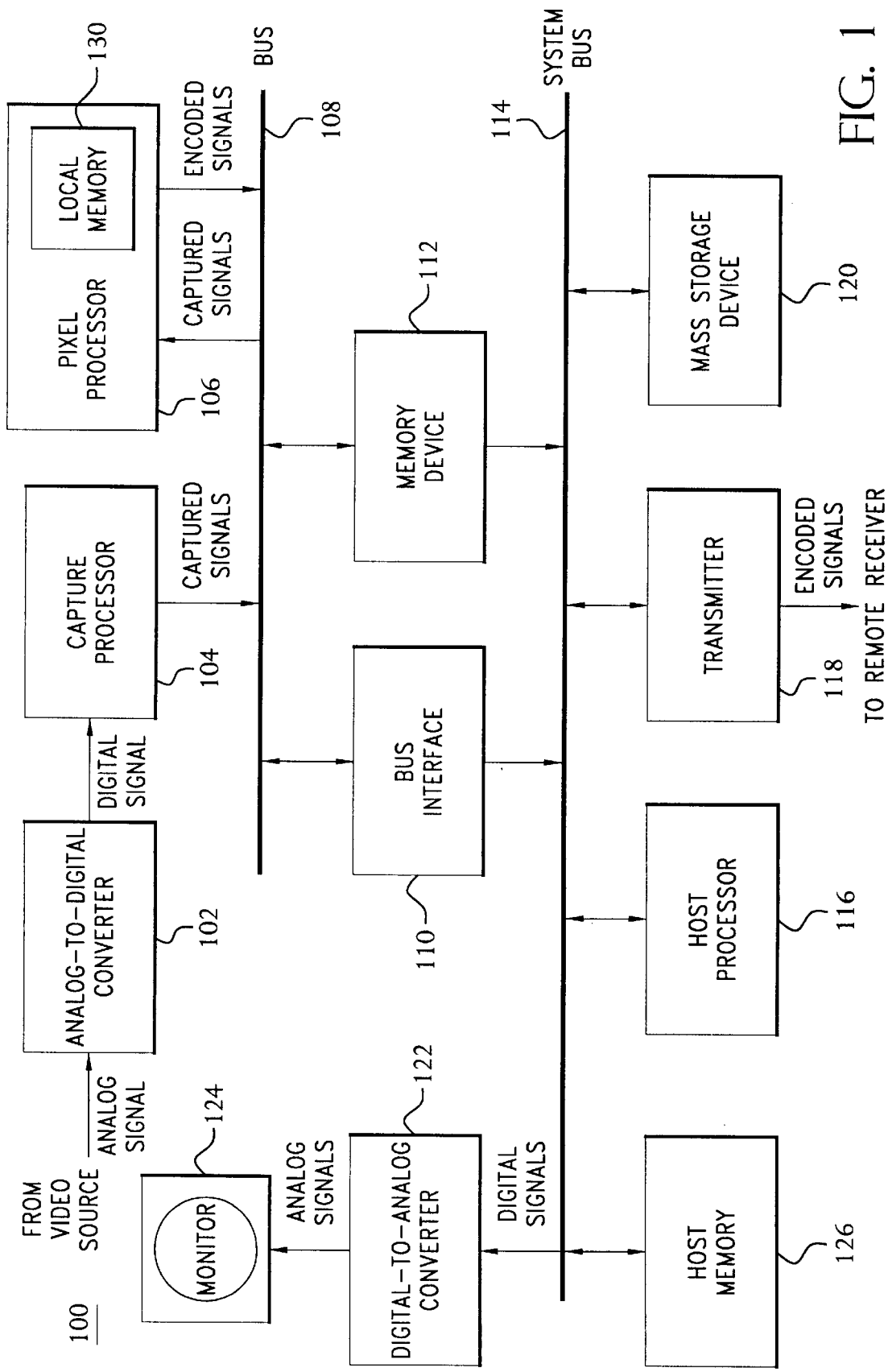
FIG. 1 is a computer-based encoding system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each frame of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV 4:1:1 format, in which every (4×4) block of pixels of the Y component plane corresponds to a single pixel in the U component plane and a single pixel in the V component plane. Alternatively, a YUV 2:1:1 format can be used.

Pixel processor 106 accesses captured bitmaps from memory device 112 via bus 108 and generates encoded image signals that represent one or more of the captured video images. Depending upon the particular encoding method implemented, pixel processor 106 applies a sequence of compression techniques to reduce the amount of data used to represent the information in each image. The compression method of motion estimation in accordance with the present invention will be further described below. The encoded image may then be stored to memory device 112 via bus 108 for transmission to host processor 116 via bus 108, bus interface 110, and system bus 114 for storage in host memory 126. Pixel processor 106 also may contain local memory 130, which is a tightly-coupled on-chip memory suitable for locally storing a number of pixels and other data. Those skilled in the art will appreciate that system bus 114 and bus 108 may be merged into the same system bus 114. It will further be understood that host processor 116 may in alternative preferred embodiments perform the functions of pixel processor 106 described herein. Similarly, in alternative preferred embodiments a general memory device such as host memory 126 or memory device 112 may perform the functions of local memory 130 described herein.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
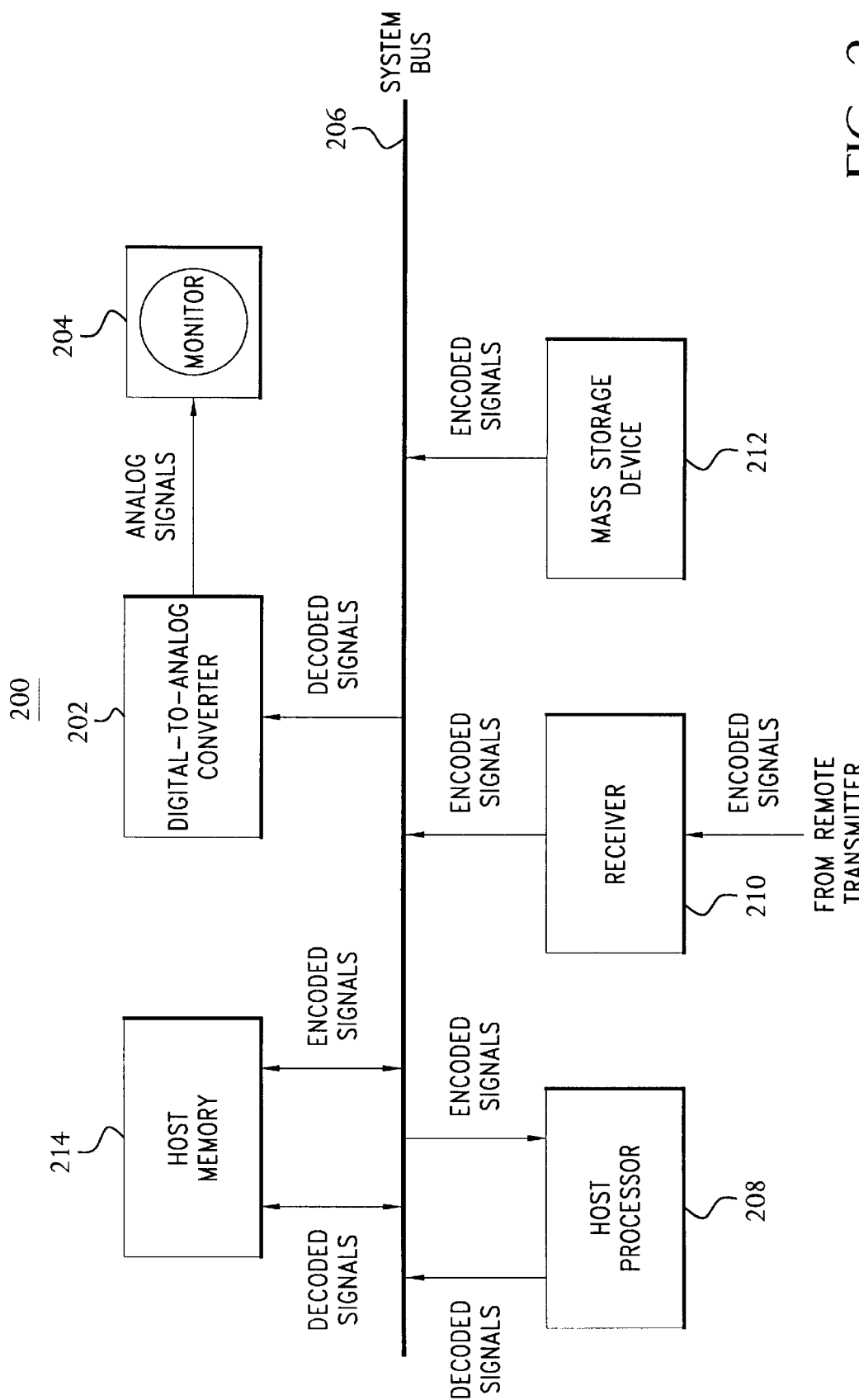
FIG. 2 is a computer-based decoding system for decoding the video signals encoded by the computer system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled frames. Pixel processor 106 may be any suitable means for encoding subsampled video image signals, where the means is capable of implementing functions such as a forward discrete cosine transform and a motion estimation and block matching procedures as described in further detail below. Memory device 112 may be any suitable computer memory device and is preferably a dynamic random access memory (DRAM) device. Bus 108 may be any suitable digital signal transfer device and is preferably an Industry Standard Architecture (ISA) bus or Extended ISA (EISA) bus or a Peripheral Component Interface (PCI) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably a PCI bus. Alternatively, system bus 114 may be an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and is preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

Referring now again to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video image signals. Those skilled in the art will understand that such a combined system may be used to display decoded video image signals in real-time during the capture and encoding of other video signals.

Figure 3:
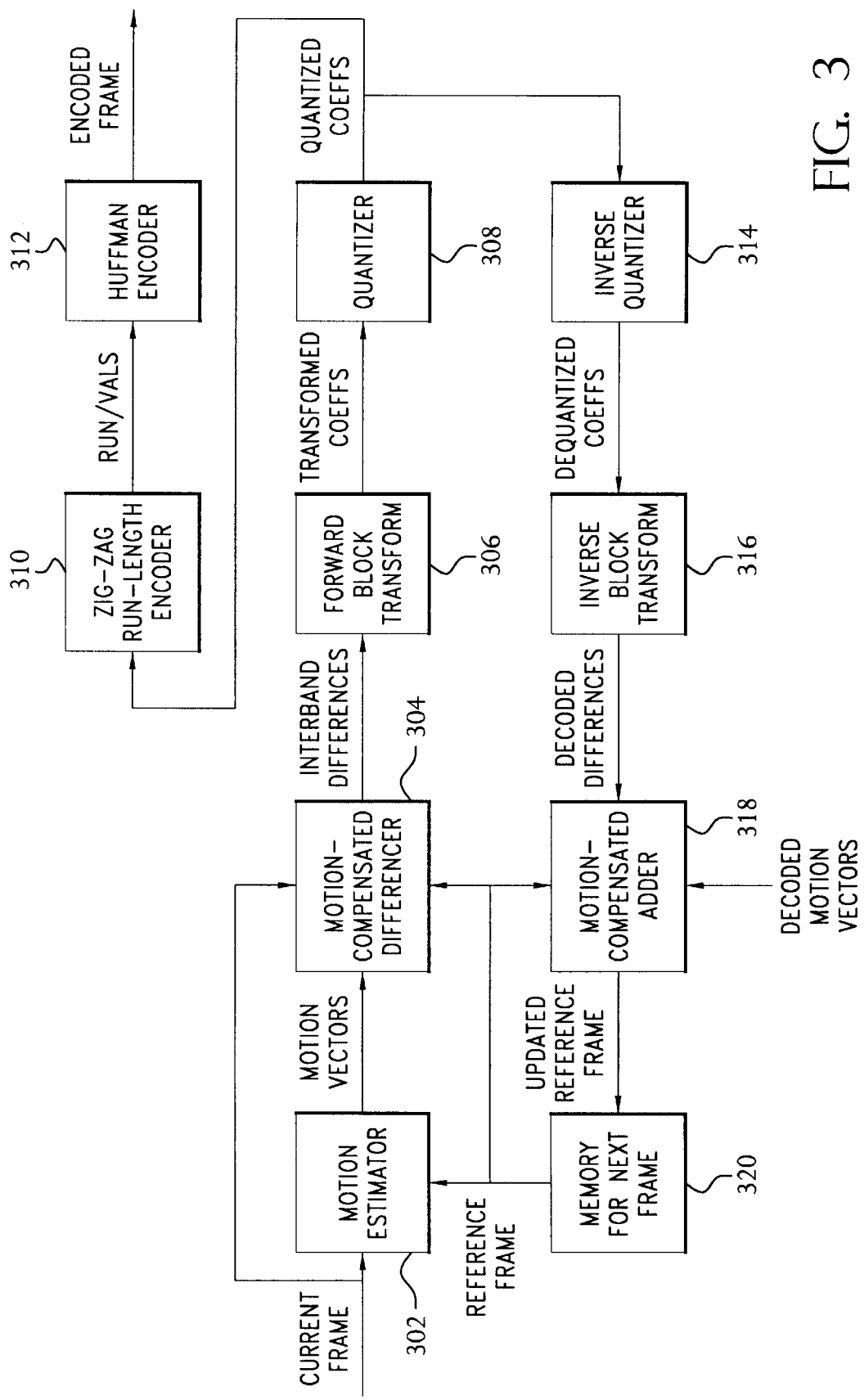
FIG. 3 is a block diagram of the encode processing of FIG. 1.

Referring now to FIG. 3, there is shown a block diagram of the encode processing of FIG. 1 which is applied to each inter-encoded frame of the video stream, according to one embodiment of the present invention. Those skilled in the art will understand that, in a video codec that employs inter-frame encoding, some of the frames are inter-encoded as predicted (i.e., delta) frames, while others are intra-encoded as key frames. For example, every eighth frame may be a key frame. The encoding of key frames may be equivalent to the encoding of inter-encoded frames without the motion estimation and motion-compensated differencing.

For an inter-encoded frame, motion estimator 302 of FIG. 3 performs motion estimation on blocks of the current frame relative to a reference frame to generate a set of motion vectors for the current frame. Those skilled in the art will understand that the reference frame is preferably the set of data generated by decoding the corresponding encoded frame for the previous frame.

It will be further understood that the motion vectors are also encoded into the compressed video bitstream. The motion vectors are preferably encoded using spatial differencing, in which each motion vector is encoded based on its difference from the previous motion vector (i.e., the adjacent motion vector following a particular scan sequence). The motion vector spatial differences are then Huffman encoded.

Motion-compensated differencer 304 applies the motion vectors to the reference frame and generates interframe differences for the current frame using the motion-compensated reference frame and the current frame.

A forward block transform 306 is then applied to each block of the interframe differences to generate transformed coefficients for the current frame. In one embodiment, transform 306 is a two-dimensional slant transform. In alternative embodiments, transform 306 may be a different transform such as, but not limited to, a one-dimensional slant transform, a one- or two-dimensional Haar transform, a DCT transform, or a hybrid transform.

Quantizer 308 quantizes the transformed coefficients to generate quantized coefficients for the current frame. Quantizer 308 applies uniform scalar quantization, wherein each coefficient is divided by a specified integer scale factor.

Zig-zag run-length encoder 310 transforms the quantized coefficients into run-length encoded (RLE) data. In a preferred embodiment, the RLE data for each block of quantized coefficients consist of a sequence of run/val pairs, where each run/val pair is a non-zero quantized coefficient value followed by a value corresponding to a run of zero quantized coefficients. The run-length encoding follows a zig-zag pattern from the upper-left corner of the block of quantized coefficients (i.e., the DC coefficient of the slant transform) to the lower-right corner (i.e., the highest frequency coefficient of the slant transform). Those skilled in the art will understand that using the zig-zag pattern provides a long run of zero coefficients for the last run of the block.

Huffman encoder 312 applies Huffman-type entropy (i.e., statistical or variable-length) coding to the RLE data to generate the encoded data for the current frame.

The encode processing of FIG. 3 also includes the decoding of the encoded frame to update the reference frame for use in encoding the corresponding next video frame. Since the run-length and Huffman encoding are lossless encoding steps, the decode loop of the encode processing begins at inverse quantizer 314, which dequantizes the quantized coefficients to generate dequantized coefficients for the current frame.

Inverse block transform 316 applies the inverse of forward block transform 306 to the dequantized coefficients to generate decoded differences for the current frame. Motion-compensated adder 318 applies decoded motion vectors (generated by decoding the encoded motion vectors) to the reference frame to perform interframe addition using the motion-compensated reference frame and the decoded differences to generate an updated reference frame. The updated reference frame is stored in memory 320 for use as the reference frame in coding the corresponding frame of the next video frame.

Figure 4:
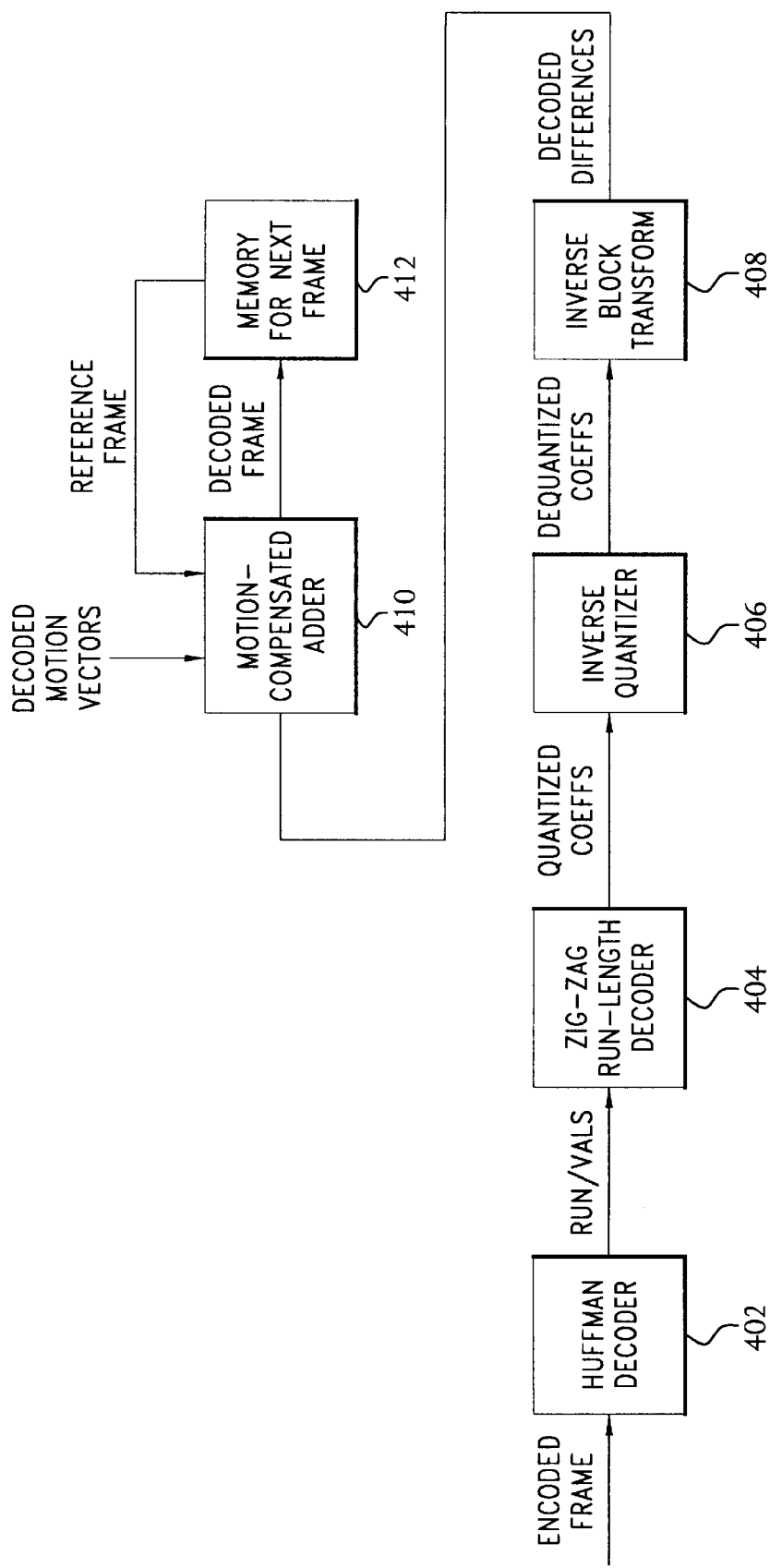
FIG. 4 is a block diagram of the decode processing of FIG. 2.

Referring now to FIG. 4, there is shown a block diagram of the decode processing of FIG. 2 that is applied to each inter-encoded frame of the encoded video bitstream, according to one embodiment of the present invention. The decode processing of FIG. 4 reverses the encode processing of FIG. 3. In particular, Huffman decoder 402 applies Huffman-type entropy decoding to the encoded data for the current frame to reconstruct the run-length encoded run/val data. Unzig-zag run-length decoder 404 transforms the RLE data into quantized coefficients. Inverse quantizer 406 dequantizes the quantized coefficients to generate dequantized coefficients. Inverse block transform 408 applies the inverse of forward block transform 306 to the dequantized coefficients to generate decoded differences. Motion-compensated adder 410 applies the decoded motion vectors for the current frame to the reference frame, and performs inter-frame addition using the motion-compensated reference frame and the decoded differences to generate the decoded data for the current frame. The decoded frame is then stored in memory 412 for use as the reference frame for decoding the corresponding frame of the next video frame.

Figure 5:
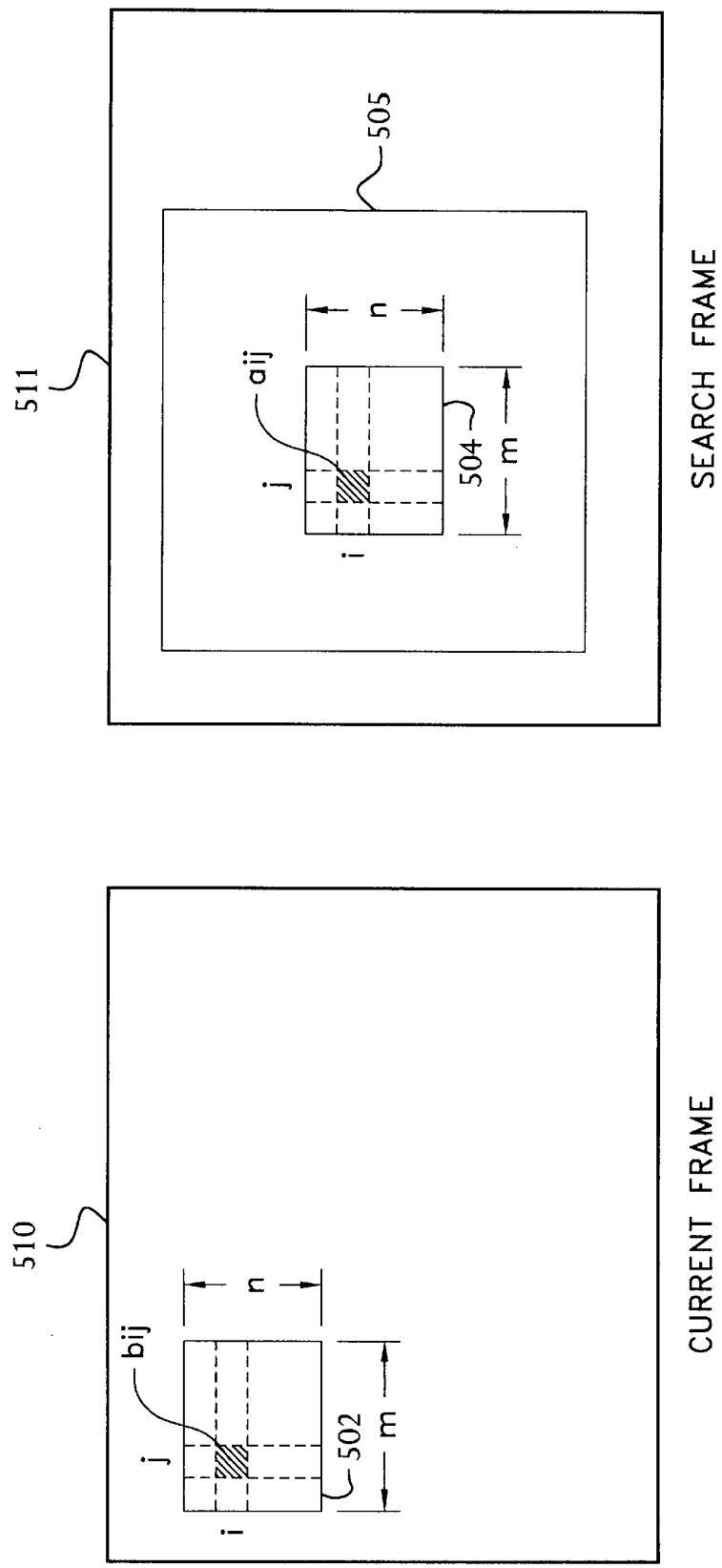
FIG. 5 depicts reference and search frames having reference and search blocks and a search area utilized in motion estimation by the computer system of FIG. 1, according to a preferred embodiment of the present invention.

Referring now to FIG. 5, there are shown current frame 510 and search frame 511 stored in memory device 112. Current frame 510 and search frame 511 are two of the most recent video frame frames of a plurality of consecutive video frames. Current frame 510 is the current video frame being compressed, and search frame 511 is a previously-decoded video frame, preferably the immediately previously-decoded video frame, which is searched by a motion estimation procedure for block matches between search frame 511 and current frame 510. Current frame 510 contains reference block 502, and search frame 511 contains search block 504 and search area 505.

Reference and search frames 510 and 511 may be of any pixel size, and in a preferred embodiment have a size of (240×352) pixels, i.e. 240 rows×352 columns of pixels. When performing block matching operations for motion estimation, current frame 510 is divided into a number of smaller regions or blocks such as reference block 502. Reference block 502 (as well as search blocks such as search block 504) may be of various sizes and shapes, as will be explained further herein. In one embodiment, reference block 502 contains a "standard block" 8×8 array of pixels. In an alternative preferred embodiment, reference block 502 contains a (16×16) "macro block" of pixels comprising four standard 8×8 pixel blocks. In further alternative embodiments, reference block 502 contains, in general, (n×m) pixels, where n is the number of rows and m is the number of columns.

When performing block matching for purposes of motion estimation, reference block 502 is compared with various search blocks such as search block 504 of search frame 511, and the aforementioned comparison measurement which represents an indication of a degree of variation between a reference block 502 and a given search block 504 is determined. Using this comparison value a match is sought. Once a match is indicated, a motion vector which indicates the location of the matching search block 504 in search frame 511 as well as the location of reference block 502 in current frame 510, may be transmitted by pixel processor 106 to remote receiver 210. It will be appreciated that other data corresponding to current frame 510 may be transmitted as well, for example data compressed with other techniques that represent other blocks within current frame 510.

Since the decoding system of FIG. 2 should already have received previously-transmitted search frame 511 containing search block 504 (where search frame 511 may have itself been compressed and then decompressed), search block 504 from search frame 511 may be used with the transmitted motion vector to reproduce reference block 502 when decompressing current frame 510. It will be understood that if a lower threshold value is utilized in block matching, it will be more difficult to find a matching block, and the motion estimation procedure may take longer, but more accurate results may be obtained. By the same token, if a higher threshold value is utilized a "match" will likely be found more quickly but potentially less accurate results might be obtained. In practice it is sometimes desirable to employ two thresholds: (1) a "stopping" threshold, which, when reached, promptly stops the search altogether; and (2) a "matching" threshold, which is typically greater than (but never less than) the stopping threshold. If the stopping threshold is never reached, then, upon completion of the search, a match is declared for the block that yields a comparison value furthest below the matching threshold. It will further be understood that if no match is found during the motion estimation process then reference block 502 might not be able to be reconstructed from a similar block from the previous search frame 511, and may therefore need to be transmitted in its entirety (for example, after being compressed by other data compression methods such a discrete cosine transform, or a slant transform).

Given two blocks such as reference block 502 and search block 504 which are to be compared with each other to determine if there is a match, a comparison measurement is performed by encoding system 100. The basis of such comparison is often a standard calculation known as the "$L_1$ Norm" (i.e. the "absolute value of the difference" norm) which has the following form:

$$L_1 \, Norm = \sum_{i=0}^{i=n} \sum_{j=0}^{j=m} |a_{ij} - b_{ij}|$$

where: $a_{ij}$ is a value of a pixel in the ith row and jth column of search block 504;

$b_{ij}$ is a value of a pixel in the ith row and jth column of reference block 502;

n is the number of rows in a block; and m is the number of columns in a block.

It will be appreciated that the lower the difference indicated by the $L_1$ Norm calculation, the more similar are the reference and search blocks being compared. It will further be appreciated that the likelihood of finding a match increases if more search blocks are compared against reference block 502, i.e. if more comparison measurements are determined. For example, an exhaustive block matching comparison may be performed, where, for each reference block 502 within current frame 510, the $L_1$ Norm is calculated for every search block 504 within search frame 511, or at least until a "match" below a certain threshold is found. It will be understood that the search blocks within search frame 511 may be displaced from each other by only one pixel or one fractional pixel horizontally or vertically and thus may overlap many neighboring search blocks by a substantial number of pixels. With fractional pixels, typically, linear interpolation is used; however, higher order interpolation such as "cubic" or "spline" can be used. In such an exhaustive search, the first search block 504 may be chosen as the search block in the uppermost and left most corner of search frame 511, the next may be the search block one pixel displacement to the right of this block (which overlaps the previous search block to some extent), and so on until reference block 502 is exhaustively compared against each possible search block 504 within search frame 511. Once the best integer pixel position is found, then a fractional pixel search nearby can be employed to find the best match.

Because such an exhaustive motion estimation procedure may be very computationally intensive, often the block matching performed by pixel processor 106 during the motion estimation procedure is performed on only a subset of possible search blocks within search frame 511. Because oftentimes a temporal correlation occurs between successive video frames such as search frame 511 and current frame 510, it is often statistically likely that any potential matches that exist will be found within a local region surrounding the location of reference block 502, perhaps even at the same location as reference block 502. The reason for this is that image features often will not move by very many pixels, if at all, from frame to frame. Therefore, a search area such as search area 505 may be selected as a subset of search frame 511. However, it will be understood that search area 505 may be as large as search frame 511 itself. When, for example, an exhaustive block matching comparison is performed by comparing a reference block 502 to each search block 504 within search frame 511, search area 505 may be considered to be equal to the entire search frame 511. In a preferred embodiment, search area 505 is a proper subset of search frame 511 and any given search block 504 is selected from search area 505, thus yielding a smaller possible number of search blocks, and consequently a smaller number of $L_1$ Norm measurements and related determinations and computations that must be performed. Those skilled in the art will appreciate that search area 505 may be (in alternative preferred embodiments) of any generalized size (p×q), to contain a selected number of search blocks 504.

Figure 6A:
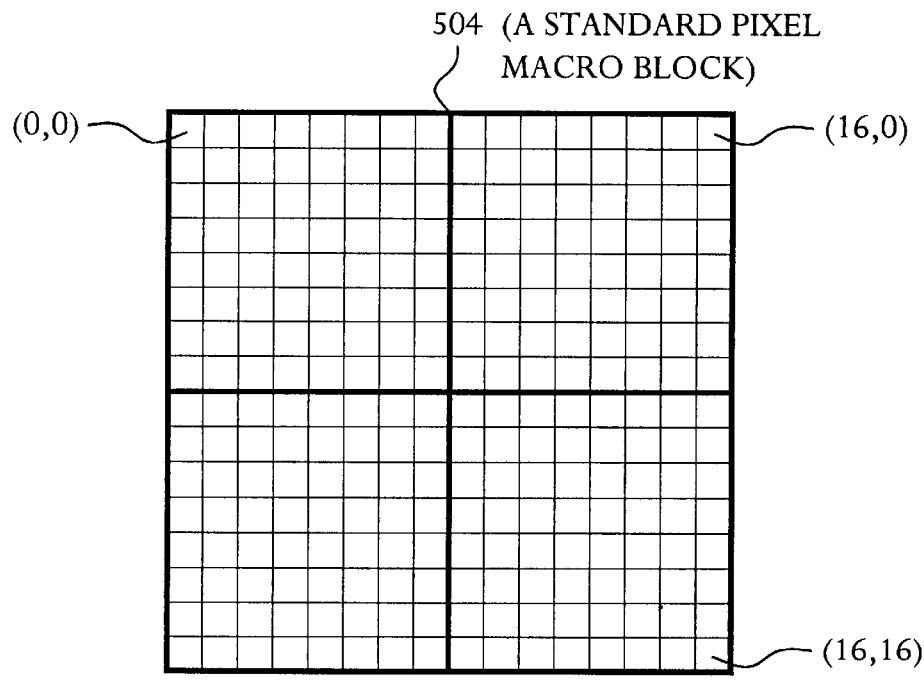
FIGS. 6A and 6B illustrate the ordering of pixels within the search block of FIG. 5, and the ordering of search blocks within the search frame of FIG. 5, respectively.
Figure 6B:
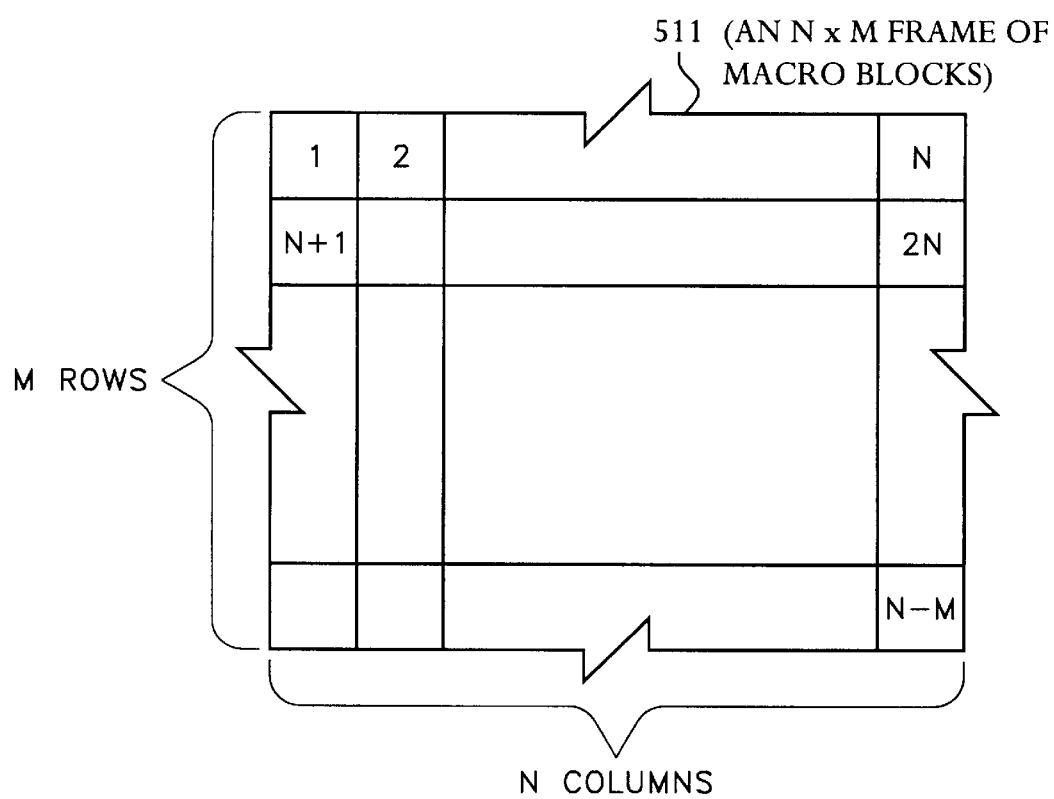

Referring now to FIGS. 6A and 6B, there is illustrated the ordering of pixels within search block 504 and the ordering of search blocks such as search block 504 within search frame 511. As shown in FIG. 6A, a given pixel i,j of a 16×16 search block 504 is located at the ith row and jth column of the block. Thus, pixel 0,0 is located in the upper left corner of search block 504 while pixel 0,15 is located in the upper right corner of search block 504. FIG. 6B shows the ordering of possible search blocks 504 within search frame 511, which are labelled in a manner similar to the pixels of FIG. 6A, where there are (M×N) search blocks within search frame 511.

Figures 7, 8:
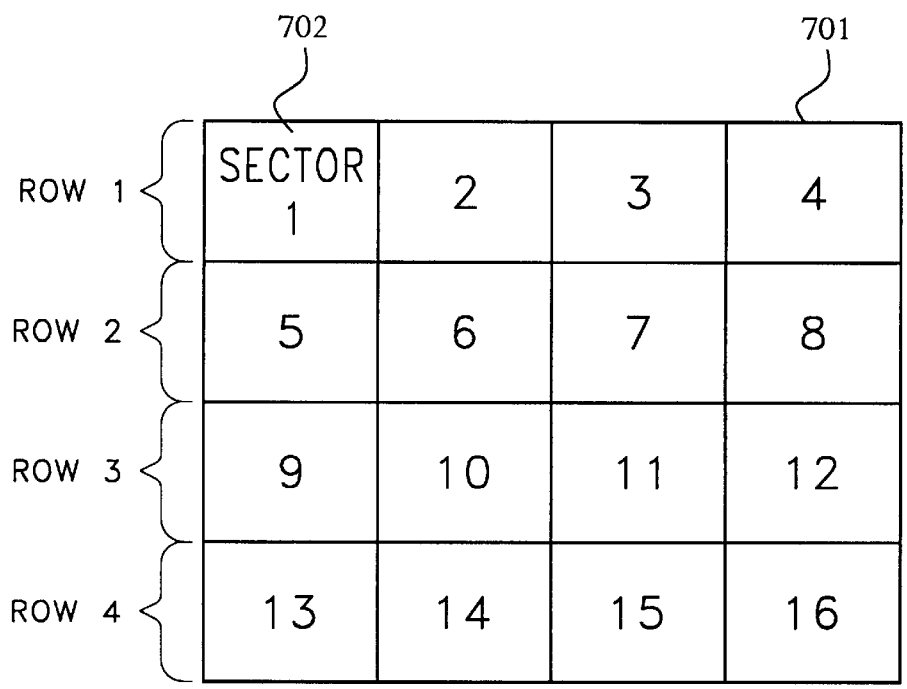
FIG. 7 shows a digital video frame divided into sixteen sectors and four rows.
FIG. 8 depicts a typical sector divided into eighty standard pixel blocks.

Referring now to FIG. 7, therein depicted in a typical video frame 701 with 16 sectors 702 and 4 rows. Frame 701 can also be characterized as having 4 quadrants: Quadrant 1 consists of Sectors 1, 2, 5, and 6; Quadrant 2 consists of Sectors 3, 4, 7, and 8; etc. This dividing up of the frame into 4 rows or 4 quadrants provides for convenient implementation of parallel processing for improved time efficiency in the processing of the large amount of video data in the frame.

For the purposes of describing the concepts of Applicant's invention, each sector 702 is considered herein to contain 80 standard 16×16 pixel blocks 504 in a 10×8 block format as shown in FIG. 8, thus creating a frame of 640×512 pixels.

It will be appreciated that calculations other than the above-described "$L_1$ Norm" may be utilized to perform comparison measurements between reference and search blocks. For example, an "$L_2$ Norm" (i.e. the "square of the absolute value of the difference" norm) has the following form:

$$L_2 \, Norm = \sum_{i=0}^{i=n} \sum_{j=0}^{j=m} (a_{ij} - b_{ij})^2.$$

The above-described norms ($L_1$ and $L_2$) are both quite useful for block matching comparisons.

In a conventional system, a new frame (to be encoded) is "tiled" using square 16×16 tiles. For each tile in the new frame, a 16×16 macroblock (which is not necessarily a tile in the reference frame) is formed which best resembles the given tile. Each tile in the new frame is replaced by the best-matching macroblock from the reference frame. The frame that is thus formed form best-matching macroblocks in the reference frame is called a motion compensated predicted (MCP) frame. What is encoded for further compression and transmission are the differences between the new frame and the MCP frame. Since the MCP frame is formed from macroblocks from spatially-distinct and possible uncorrelated areas of the reference frame, errors will naturally occur at the tile boundaries. These errors will tend to accumulate from frame to frame in the frames occurring between reference frames.

Similar errors will also build up along standard block boundaries when using block based transform of a frame, irrespective of motion compensation block matching, due to the fact that adjoining or neighboring blocks are transformed and quantized independent of each other. Hence, the error for adjoining blocks is uncorrelated.

Temporal staggering of the starting points of sequential video data blocks reduces the problem of boundary error buildup for both block-based transform coding and block-based motion compensation. A practical implementation of this technique is discussed below with reference to FIGS. 9 and 10.

Figure 9:
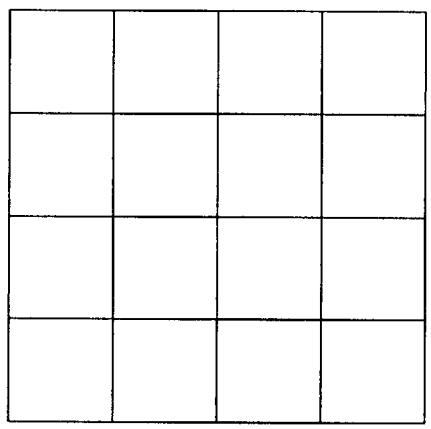
FIG. 9 shows a sequence of frames divided into blocks using an unvarying tile pattern and associated edge-error buildup.
Figure 9:
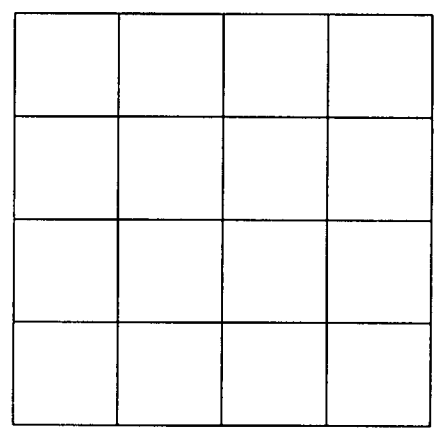
Figure 9:
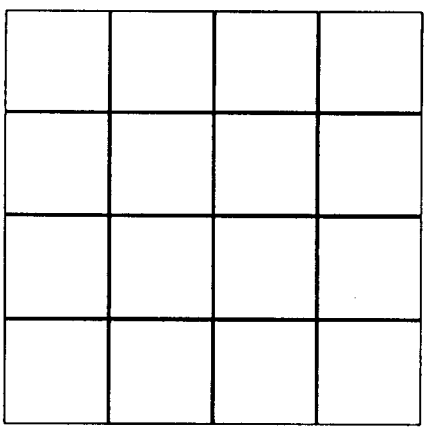
Figure 9:
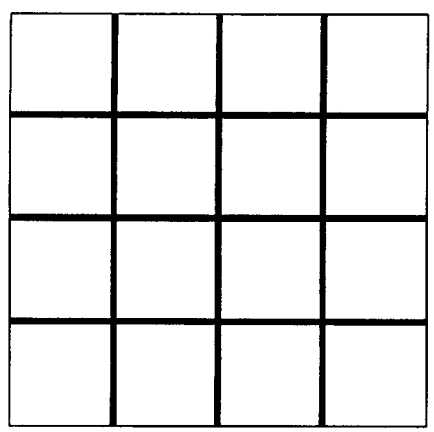

FIG. 9 shows an example of error buildup at tile edges when using either of block-based transform coding or block-based motion compensation or both. As shown, for example in FIG. 9, a same tiling pattern is used from frame 0 to frame 3. Since it is known that error will tend to appear at tile edges, use of a same tiling pattern from frame-to-frame allows edge-error to accumulate over time resulting in visual artifacts, such as blockiness. A representation of the accumulation of tile edge-errors over time is shown in FIG. 9 by the increasing darkness of the tile boundaries from frame 0 to frame 3.

Figure 10:
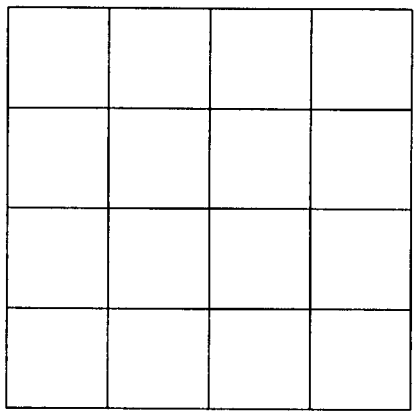
FIG. 10 shows a sequence of frames divided into blocks using a varying tile pattern and the associated limiting of accumulated edge-error buildup.
Figure 10:
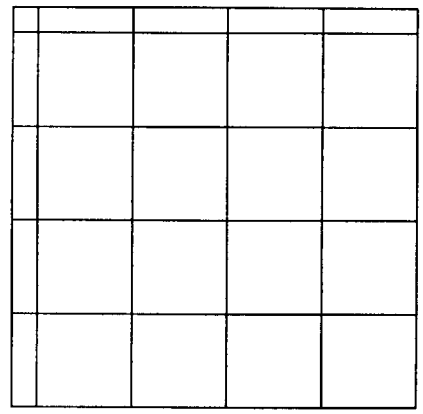
Figure 10:
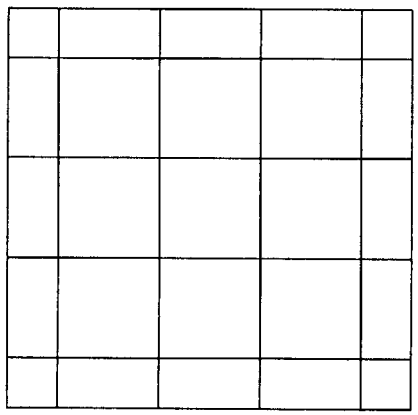
Figure 10:
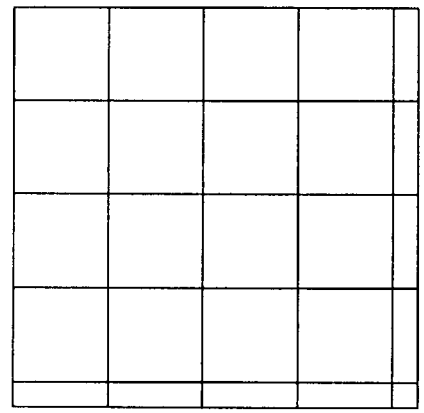

The invention reduces tile edge-errors, and inhibits accumulation of tile edge-error over time, by staggering tile positions over time, as shown, for example in FIG. 10. In FIG. 10, a first tiling pattern for frame 0 results in a first pattern of tile edge-errors. In frame 1, the tiling pattern has been changed, placing the edges of the blocks or tiles in locations distinct from the block or tile edge positions of frame 0. Any pattern of tile edge-errors is shifted in accordance with the change of tiling pattern, thereby inhibiting accumulation of tile edge-error, for example from frame 0 to frame 1. Although there still might be some tile edge-error associated with the tiling pattern of frame 1, any error would be of a magnitude similar to, and typically not greater than, the tiling edge-error of frame 0, and would occur at different locations within the frame.

Frames 2 and 3 of FIG. 10 represent additional tile patterns to further prevent tile edge-error buildup from frame-to-frame. Accumulation of tiling edge-errors at identical block or tile edge positions, which can build up over time to introduce observable artifacts in an image, is reduced by the invention, which changes the tiling patterns from frame-to-frame to avoid placement of a block or tile edge in a same position from one frame to the next. The sequence of tile patterns of FIG. 10 may be repeated for subsequent frames.

The embodiment of the invention shown in FIG. 10, as discussed above, uses different tiling patterns wherein the blocks at the edges of the frame are differently sized. Also, it is within the scope of the invention to use different size blocks from frame-to-frame, for example changing block size from 16×16, to 8×8, to 4×4, etc. as a method for moving block edge positions within a frame to reduce edge-error buildup. In each case, the motion estimation or block-based transform is applied to such blocks which are differently sized from block-to-block and/or frame-to-frame. Motion estimation and transform systems of the type described above react in real time, therefore, to accommodate the size of the block being processed. For example, processing is adjusted such that a 4×16 block in a current frame is matched with a 4×16 block in a reference frame; and an 8×8 block in the current frame is matched with an 8×8 block in the reference frame, etc. Certain embodiments of block-based motion estimation and transform systems, however, could have difficulty processing a stream of blocks which differ in size as a function of the tiling pattern employed. It is within the scope of the invention, therefore, to employ the invention for block-based motion compensation and block-based transforms when the blocks are of equal size. An example is shown in FIGS. 11 and 12.

Figure 11:
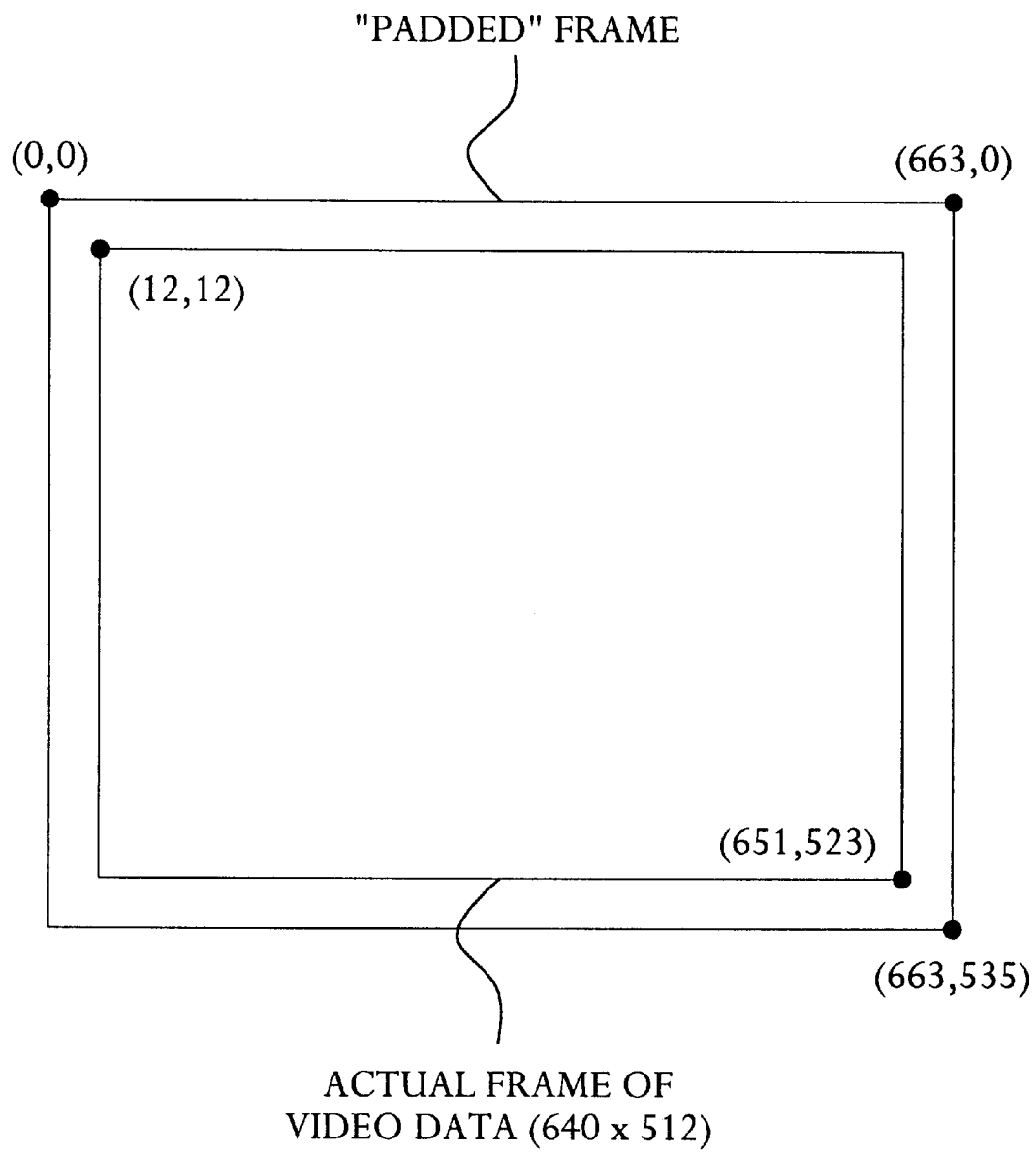
FIG. 11 shows an actual frame of video data situated within a slightly larger "padded" frame.

FIG. 11 shows a "padded" frame with a twelve pixel border around a standard 640×512 pixel digital video frame. Use of a padded frame enables the invention to operate on identically sized blocks. The border, for example, is a replication of the pixels around the periphery of the 640×512 pixel video image frame. Each pixel comprising the periphery of the video image frame is repeated outward, for example, as many times as is required to fill out the 664×536 pixel padded frame. Alternatively, the border between the video image frame and the padded frame can be a solid color, such as black or white, or preferably gray. Preferably, the border is removed by a decoder to prevent its appearance in the decoded, displayed video image.

Figure 12:
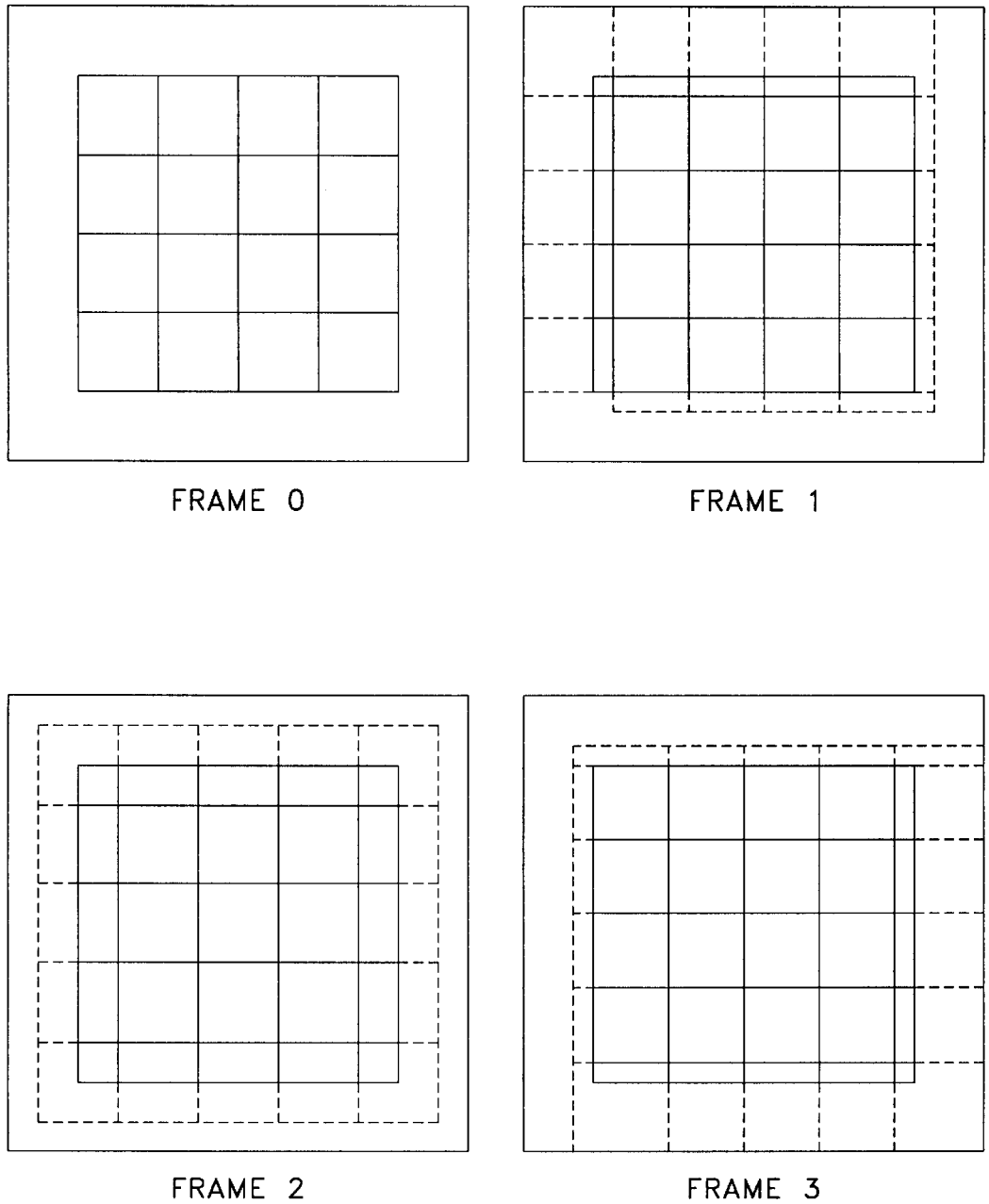
FIG. 12 shows implementation of the padding to fill out smaller blocks around the periphery of the frame so that each block in the frame can be processed as a full size block.

Use of the padded frame is shown in FIG. 12. As shown in FIG. 12, the tiling pattern varies from frame-to-frame such that the blocks around the edge of the image in frames 1–3 vary in size and are different than the square, for example, 16×16 blocks of frame 0 and those in the interior of all of the frames.

FIG. 12 shows the same sequence of tiling patterns as FIG. 10, but using padding to complete the partial edge blocks. As shown in FIG. 12, the padding is operable to extend the dimensions of the blocks around the periphery of the video image frame in frames 1–3 to a full, for example 16×16 block size. These blocks then can be treated by the block-based motion estimation and transform systems as full 16×16 blocks. Therefore, for example when applying block-based motion estimation, every block in the current frame is treated as a 16×16 block and the system searches for a matching 16×16 block in the reference frame, even though only a portion of the block includes actual image data. The remainder of the block is completed with as much of the padding as is necessary to expand the block out to its full 16×16 size. This simplifies the motion estimation process since the motion estimator can be set to search, for example, only for 16×16 blocks in the reference frame, and not have to rapidly change in real time to search for varyingly sized blocks.

In order to properly decode frames encoded by the apparatus and method of the invention, it is necessary for the decoder to know of the particular tiling pattern employed by the encoder for every frame. There are at least two options available for ensuring correspondence between the pattern encoded and the pattern decoded. In one embodiment, the sequence of tiling patterns is predetermined, whereby the decoder is instructed to decode the blocks or tiles according to the predetermined sequence. No instructions need be sent to the decoder on a real time basis for alerting it to the particular tiling pattern used by the encoder for a given frame.

Alternatively, the encoder can transmit to the decoder, such as in a header to the encoded frame information, a signal representing the particular tiling pattern employed for that encoded, transmitted frame. The decoder can thus make real time adjustments based on the signal to properly decode the blocks according to the particular tiling pattern employed for that frame.

The invention is directed to encoding images using different tiling patterns. The invention is also directed to decoding images using different tiling patterns. In a preferred embodiment, the tiling pattern is changed between each consecutive pair of frames. In alternative embodiments, other sequences may be used.

The present invention comprises computer-implemented processes and apparatuses for practicing those processes, as well as computer programs embodied in tangible media, such as floppy diskettes, CD-ROMs, hard drives, or any other computer-readable medium, wherein, when the computer program is loaded into and executed by a computer, the computer becomes an apparatus for practicing the invention.

Those skilled in the art will recognize that many variations of the concept of the instant invention are possible without departing from the scope of the appended claims and their fair equivalents.

What is claimed is:

1. A computer-implemented process for encoding images, comprising the steps of:
   (a) receiving a first image;
   (b) dividing the first image into a plurality of blocks using a first tiling pattern, comprising the steps of:
      (1) padding the first image to generate a first padded frame; and
      (2) dividing the first padded frame into the plurality of blocks of the first image;
   (c) encoding the blocks of the first image to generate encoded signals for the first image;
   (d) receiving a second image;
   (e) dividing the second image into a plurality of blocks using a second tiling pattern different from the first tiling pattern; and
   (f) encoding the blocks of the second image to generate encoded signals for the second image.

2. The process of claim 1, wherein step (c) comprises the step of encoding the blocks of the first image using motion estimation.

3. The process of claim 1, wherein step (c) comprises the step of encoding the blocks of the first image using a block based transform.

4. The process of claim 1, wherein step (b) (1) comprises the step of replicating pixels around a periphery of the first image.

5. The process of claim 1, wherein step (c) further comprises the step of encoding the first tiling pattern into the encoded signals for the first image.

6. An apparatus for encoding images, comprising:
   (a) means for receiving a first image;
   (b) means for dividing the first image into a plurality of blocks using a first tiling pattern, wherein means (b):
      (1) pads the first image to generate a first padded frame; and
      (2) divides the first padded frame into the plurality of blocks of the first image;
   (c) means for encoding the blocks of the first image to generate encoded signals for the first image;
   (d) means for receiving a second image;
   (e) means for dividing the second image into a plurality of blocks using a second tiling pattern different from the first tiling pattern; and
   (f) means for encoding the blocks of the second image to generate encoded signals for the second image.

7. The apparatus of claim 6, wherein means (c) encodes the blocks of the first image using motion estimation.

8. The apparatus of claim 6, wherein means (c) encodes the blocks of the first image using a block based transform.

9. The apparatus of claim 6, wherein means (b) replicates pixels around a periphery of the first image.

10. The apparatus of claim 6, wherein means (c) encodes the first tiling pattern into the encoded signals for the first image.

11. A computer-implemented process for decoding images which have been encoded using one or more tiling patterns, comprising the steps of:
   (a) receiving encoded signals of a first image;
   (b) decoding the received encoded signals of the first image based on a first tiling pattern to generate a decoded first image, comprising the step of deleting signals from the encoded signals of the first image to remove padding from the decoded first image;
   (c) receiving encoded signals of a second image; and
   (d) decoding the received encoded signals of the second image based on a second tiling pattern different from the first tiling pattern to generate a decoded second image.

12. The process of claim 11, wherein step (b) comprises the step of decoding the signals of the first image using motion compensation.

13. The process of claim 11, wherein step (b) comprises the step of decoding the signals of the first image using an inverse block based transform.

14. The process of claim 11, wherein deletion of the signals deletes pixels around a periphery of the first image.

15. The process of claim 11, wherein the encoded signal of the first image comprise the first tiling pattern and step (b) further comprises the step of decoding the encoded signals to determine the first tiling pattern.

16. An apparatus for decoding images comprising:
   (a) means for receiving encoded signals of a first image;
   (b) means for decoding the received encoded signals of the first image based on a first tiling pattern to generate a decoded first image, wherein means (b) deletes signals from the encoded signals of the first image to remove padding from the decoded first image;
   (c) means for receiving encoded signals of a second image; and
   (d) means for decoding the received encoded signals of the second image based on a second tiling pattern different than the first tiling pattern to generate a decoded second image.

17. The apparatus of claim 16, wherein means (b) decodes the signals of the first image using motion compensation.

18. The apparatus of claim 16, wherein means (b) decodes the signals of the first image using an inverse block based transform.

19. The apparatus of claim 16, wherein means (b) deletes pixels around a periphery of the decoded first image.

20. The apparatus of claim 16, wherein the encoded signals of the first image comprise the first tiling pattern and means (b) decodes the encoded signals to determine the first tiling pattern.

21. The process of claim 1, wherein the blocks of the first image are of equal size.

22. The process of claim 1, wherein at least two of the blocks of the first image are of different size.

23. The process of claim 1, wherein the blocks of the first image have a different size than the blocks of the second image.

24. The apparatus of claim 6, wherein the blocks of the first image are of equal size.

25. The apparatus of claim 6, wherein at least two of the blocks of the first image are of different size.

26. The apparatus of claim 6, wherein the blocks of the first image have a different size than the blocks of the second image.

27. The process of claim 11, wherein the first tiling pattern is comprised of blocks of equal size.

28. The process of claim 11, wherein the first tiling pattern is comprised of blocks and wherein at least two of the blocks of the first image are of different size.

29. The process of claim 11, wherein the first tiling pattern is comprised of blocks having a first size and the second tiling pattern is comprised of blocks having a second size different than the first size.

30. The apparatus of claim 16, wherein the first tiling pattern is comprised of blocks of equal size.

31. The apparatus of claim 16, wherein the first tiling pattern is comprised of blocks and wherein at least two of the blocks of the first image are of different size.

32. The apparatus of claim 16, wherein the first tiling pattern is comprised of blocks having a first size and the second tiling pattern is comprised of blocks having a second size different than the first size.

* * * * *